Aug. 25, 1964  A. PEARLMAN  3,146,018
VEHICLE WITH EXPANDIBLE CARGO SPACE IN TOP
Filed Sept. 7, 1962  2 Sheets-Sheet 1
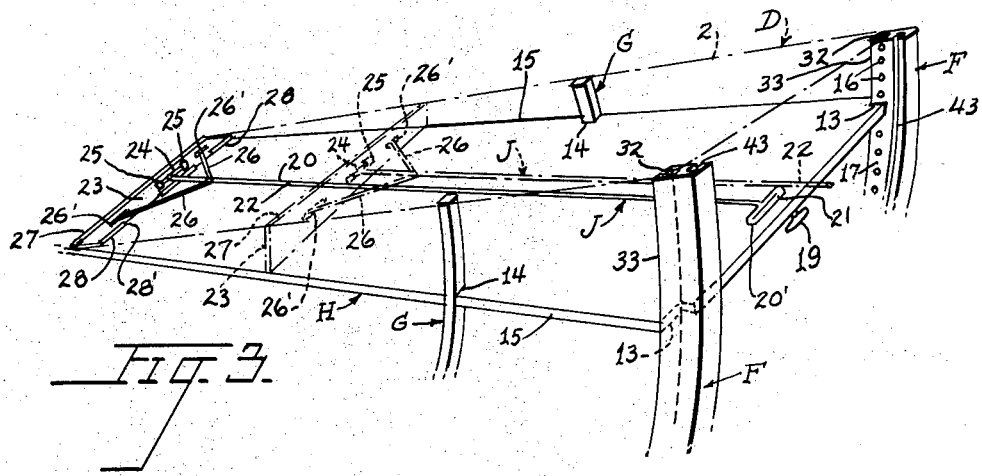
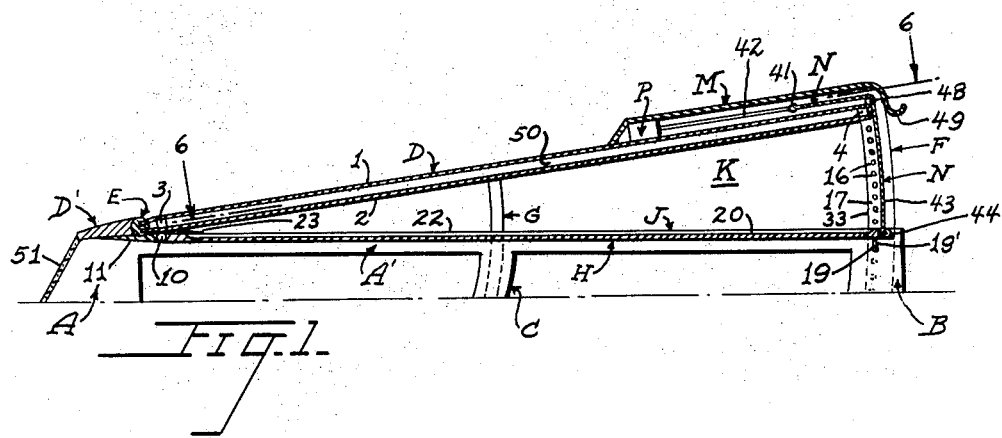
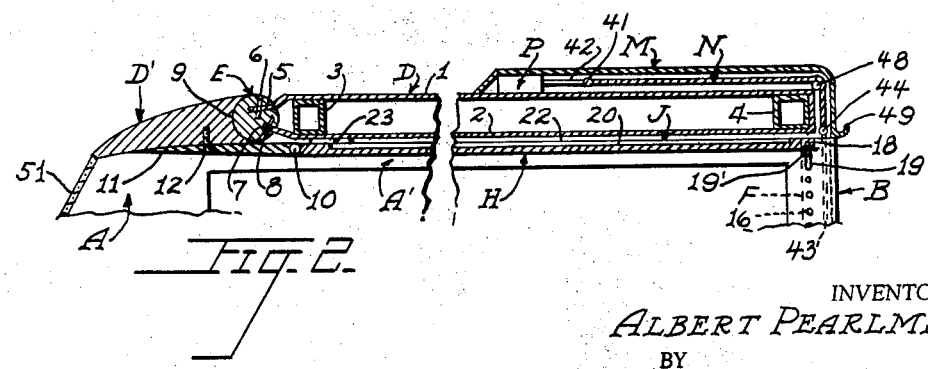
INVENTOR.
ALBERT PEARLMAN
BY William R. Piper
ATTORNEY

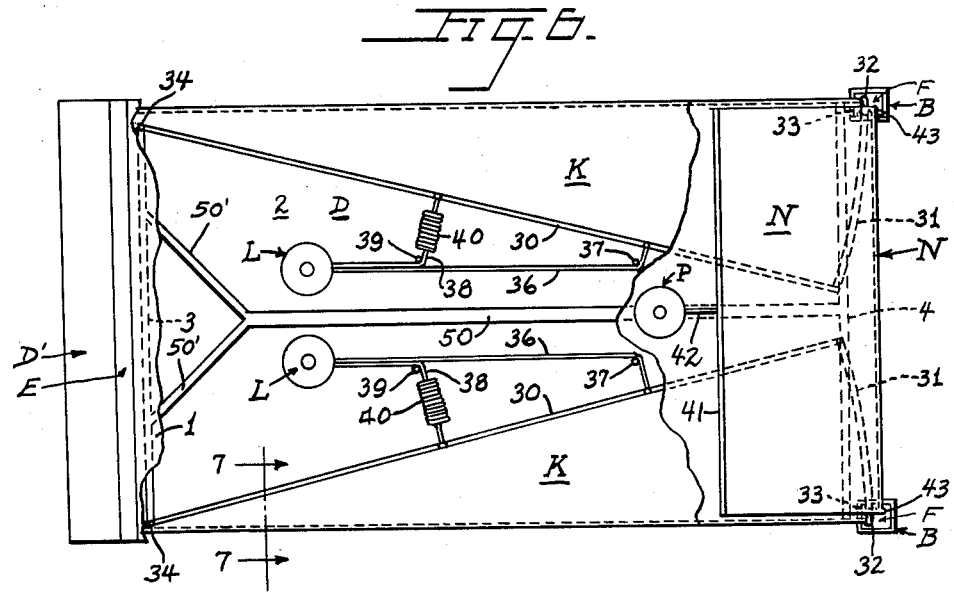
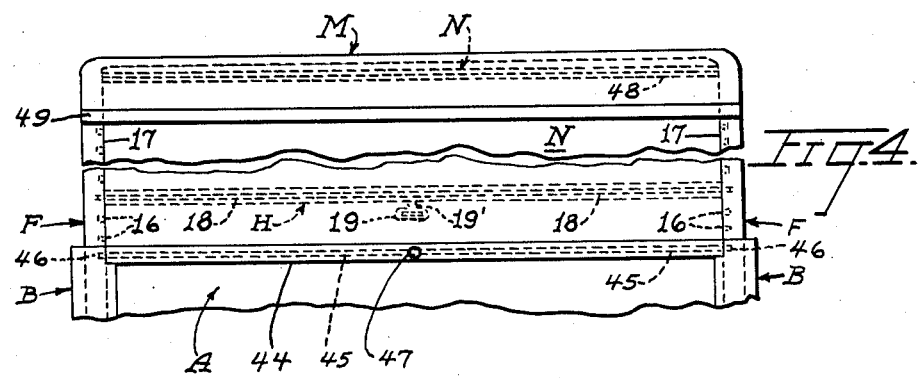
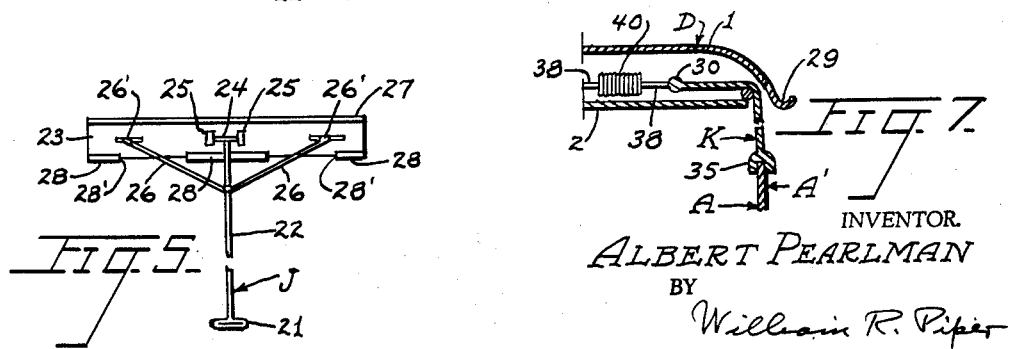

United States Patent Office  3,146,018
Patented Aug. 25, 1964

3,146,018
VEHICLE WITH EXPANDIBLE CARGO SPACE IN TOP
Albert Pearlman, 2470 30th Ave., San Francisco, Calif.
Filed Sept. 7, 1962, Ser. No. 222,106
7 Claims. (Cl. 296—26)

The present invention relates to improvements in a vehicle with expandible cargo space in top and it consists in the combinations, construction and arrangement of parts hereinafter described and claimed.

This invention is an improvement over my application for a vehicle with height-adjustable top for varying cargo space, Serial No. 85,850, filed January 30, 1961, now Patent No. 3,061,359, issued October 30, 1962. In the companion case I disclose a convertible vehicle, preferably a station wagon, in which the top may be raised relative to the body so as to afford adequate headroom and to increase the cargo capacity. The top is hinged at its forward end and when it is raised, it will pivot about this hinge. When the top is in closed position it will resemble the normal appearance of the vehicle and when the top is raised it will make a harmonious appearance to the vehicle.

In the companion case side flaps and a rear flap are movable into position to form closures automatically for the spaces between the vehicle top and the sides and rear walls of the vehicle when the top is swung upwardly into an annular position. For this purpose the top is provided with upper and lower roofs which define a space therebetween for receiving the unexposed side flaps. A rear dome is also formed on the vehicle top for receiving the unexposed portion of the rear flap.

The present invention makes use of the parts disclosed in my companion case and in addition I provide a deck underlying the lower roof of the hinged vehicle top and provided with a hinge at its forward end that connects it to the stationary front portion of the top. The top can be raised independently of the deck and provides a cargo receiving space between the top and the deck. It is possible to enclose the open sides and rear of the raised top by the side and rear flaps which are automatically extended when the top is raised and retracted when the top is lowered. It is also possible to swing the deck into desired angular positions with respect to the raised top for increasing the head room in the vehicle body and for varying the cargo-carrying capacity of the compartment formed between the top and deck.

I also provide a novel cargo retriever in the present case that will take up no additional storage space when not in use, but which has novel means for swinging a blade pivotally attached to the handle from a horizontal to a vertical position as the handle of the retriever is pulled rearwardly. In this way the retriever will move articles, stored near the forward end of the cargo-receiving compartment, toward the rear of the compartment where they can be reached by the operator and removed. It is also possible to use the retriever to move articles toward the forward end of the compartment to make room for additional articles to be received.

A further object of my invention is to provide a device of the type described which is simple in construction and durable and efficient for the purpose intended.

Other objects and advantages will appear as the specification continues. The novel features of the invention will be set forth in the appended claims.

Drawings

For a better understanding of my invention, reference should be made to the accompanying drawings, forming part of this specification, in which:

FIGURE 1 is a longitudinal section through the upper portion of a vehicle and shows my hinged vehicle top and hinged deck operatively applied thereto with the top in raised position and the deck in a horizontal position;

FIGURE 2 is a sectional view similar to FIGURE 1, but on a larger scale and with the vehicle top in closed position;

FIGURE 3 is a schematic perspective view showing the deck in its relation to the arcuate posts that support the vehicle top in its raised position and further showing how the cargo retriever is supported in inoperative position by the deck;

FIGURE 4 is a rear elevation of the vehicle showing the top and deck in raised positions and illustrating how the rear flap or curtain closes the space between the top and the vehicle body;

FIGURE 5 is a plan view of the cargo retriever;

FIGURE 6 is a plan view of the interiors of the vehicle top and dome to show the automatic means for retracting the unexposed portions of the side and rear flaps and is taken substantially along the line 6—6 of FIGURE 1; and FIGURE 7 is an enlarged sectional view taken along the line 7—7 of FIGURE 6.

While I have shown only the preferred form of my invention, it should be understood that various changes, or modifications, may be made within the scope of the annexed claims without departing from the spirit thereof.

Detailed Description

In carrying out my invention I show in FIGURE 1, a longitudinal section through the upper portion of a vehicle A such as a station wagon. The vehicle is provided with a pair of tubular rear corner columns B and a pair of intermediate tubular outer columns C. A vehicle top is indicated generally at D and FIGURE 2 shows this top in longitudinal section on a larger scale. The two sides of the vehicle have top rails A' shown in FIGURES 1, 2 and 7.

The vehicle top has an upper roof 1 and a lower roof 2. Hollow frame members extend transversely across the top and are disposed between the two roof members. I show a front hollow frame member 3 and a rear hollow frame member 4. The front edge of the upper roof extends into a slot 5 provided in a cylindrical member E. Screws 6 or other suitable fastening means secure the front edge of the upper roof 1 to the cylindrical member E. The lower roof member 2 has its front edge extending into a slot 7 of the cylindrical member E and screws 8 are used for securing it in place.

The vehicle A has a stationary front roof portion D' and the rear edge of this portion is formed into a semi-cylindrical recess 9 for rockably receiving the cylindrical member E. The sides of the front roof portion D' may have bearings (not shown) for rotatably supporting the cylindrical member E. The front edge of the stationary roof portion D' connects with the top of the windshield 51 of the vehicle. The rear wall or rear door of the vehicle body A are not illustrated in FIGURES 1 and 2. The rear elevation of the vehicle body A in FIGURE 4 could have a door or tail gate which would not extend above the tops of the rear corner columns B.

In FIGURE 3, I show the hinged vehicle top D by the dot-dash lines in a schematic perspective view. At the rear corners of the top D, I provide a pair of arcuate posts F and these are secured to the vehicle top D at their upper ends and are slidably received in the pair of rear tubular corner columns B of the vehicle A shown in FIGURES 1 and 2. The pivotal center for the arcuate rear posts F is the longitudinal axis of the cylindrical member E. The hinged vehicle top D may also be supported by a pair of intermediate arcuate posts G as shown schematically in FIGURE 3 and further shown in FIGURE 1. In certain cases the intermediate arcuate posts G may not be used. FIGURE 2 shows the tubular column B and the post F as being straight. This is done only for clarity. FIGURE 1 shows the column B large enough to receive the arcuate posts F. The column B may also be arcuate.

FIGURES 1 to 3 inclusive illustrate a cargo supporting deck H which underlies the lower roof 2 of the vehicle top D and is hinged at its forward edge as at 10 to a horizontal supporting member 11. The hinge 10 is preferably a piano hinge that extends throughout the front edge of the deck. The supporting member 11 is secured to the underside of the front roof stationary portion D' by screws 12. In FIGURE 2, I show the vehicle top D in closed position while in FIGURE 1, I show the same top in a raised position. In both FIGURES 1 and 2, I show the deck H in a horizontal position with its rear edge resting on the tops of the rear pair of tubular corner columns B. The deck has cut-out rear corners 13 for slidably receiving the rear arcuate posts F and it has recesses 14 formed in its sides 15 for slidably receiving the intermediate arcuate posts G.

In FIGURES 1 to 4 inclusive, I illustrate the means for supporting the deck H in a raised angular position when the vehicle top D has been raised into an angular position. When the vehicle top D is raised, the rear arcuate posts F as well as the intermediate arcuate posts G will move upwardly out of their tubular guide and supporting members B and C respectively. It is possible to raise the top into a desired angular position by hydraulic or other suitable means (not shown) up to the limit of travel.

Each rear arcuate post F is provided with a plurality of recesses 16 on its inner surface 17. FIGURE 4 shows a rear view of the vehicle A and illustrates the deck H in a slightly raised position above the tops of the rear pair of tubular corner columns B. A pair of locking rods 18 are slidably received in a transverse bore provided near the rear edge of the deck H. The outer ends of these locking rods are designed to enter a selected pair of openings or recesses 16 in the arcuate rear posts F as shown in FIGURE 4. An actuating handle 19 for operating the pair of rods 18 is centrally disposed between the sides 15 of the deck and projects below the under surface of the deck. It is possible to have the shank 19' of the handle provided with a pinion (not shown). The inner ends of the locking rods 18 may be provided with rack portions (not shown) which mesh with the pinion. A rotation of the handle 19 in one direction will retract the locking rods from the recesses 16 and free the deck H from the arcuate rear posts F. A rotation of the handle 19 in the opposite direction will extend the locking rods 18 into the selected recess or openings 16 in the rear arcuate posts F. The mechanism of the handle 19 and its operative connection with the locking rods 18 is well known and does not need illustration. By this arrangement, the deck can be moved from its horizontal position shown in FIGURES 1 and 2 into a raised position as shown in FIGURE 4 and locked in this position.

It will be seen from FIGURES 3 and 5 that I provide a novel cargo retriever indicated generally at J. The purpose of the retriever is to reach articles which may have been placed on the deck H and moved to a forward position near to the hinge 10. The cargo space is wedge-shaped because the vehicle top D is swingable about its front cylinder as a hinge and likewise the deck H is swingable about its hinge 10. The hinge 10 is placed near to the cylinder E.

Again referring to FIGURES 3 and 5 as well as FIGURE 2, it will be seen that I provide a centrally disposed and longitudinally extending groove 20 in the upper surface of the deck H. This groove 20 is enlarged into a recess at 20' for receiving the handle 21 of the cargo retriever J. The handle 21 is provided at the free end of a shank 22 and this shank is pivotally secured at its other end to a package moving blade 23. A pivot pin 24 extends at right angles to the shank 22 and has its ends pivotally received in bearings 25 that are mounted on the blade 23. Reinforcing struts 26 are connected to the shank 22 and have their free ends pivotally connected to the blade 23 at 26'. The blade is provided with a rounded rubber edge 27 that extends from end to end of the blade. The other edge of the blade is provided with a second rounded rubber edge 28 and this rubber edge has cut-away portions at 28' for receiving the struts 26 when the blade is in horizontal or inoperative position.

Normally the cargo retriever J will be in the position shown in FIGURE 3 when it is supported by the deck H. The shank 22 will be received in the longitudinal groove 20 in the deck and the blade 23 will be in a horizontal position and will lie on the upper surface of the deck with its rubber edge 27 disposed close to the piano hinge 10.

When cargo is carried by the deck H, the vehicle top D will be angularly inclined as shown in FIGURE 1 and the deck may still remain in a horizontal position or it may be raised into a slight angular position as shown in FIGURE 4 if more head room is desired in the vehicle.

When the cargo retriever J is used for removing articles that have been placed near the forward end of the deck, the operator lifts the handle 21 from the recess 20' and pulls rearwardly. Since the pin 24 is pivoted to the blade 23 and since the struts 26 are also pivoted to the blade at points 26' which are in line with the pivot pin 24, then the initial rearward movement of the shank 22 will cause the blade 23 to start to swing upwardly into an upright position. In FIGURE 3, I show the blade 23 in an upright position by the dot dash lines and the blade will remain in this position during the remainder of its rearward movement.

The blade can have an overall length equal to the width of the deck H. However, if it desired to move the blade past the intermediate arcuate posts G, then the overall length of the blade must not be more than the distance between the inner sides of the intermediate posts G. Usually the posts G are not positioned in front of the rear arcuate posts F a distance greater than that which can be reached by a person standing at the rear of the deck. Therefore the blade 23 could have a length equal to the width of the deck and be movable up to the intermediate arcuate posts G for retrieving articles placed on the deck and forward of these posts.

In my companion application on a Vehicle With Height Adjustable Top for Varying Cargo Space, Serial No. 85,850, filed January 30, 1961 now Patent No. 3,061,359, I disclose side flaps for closing the space between the sides of the vehicle top D and the top rails of the vehicle when the top has been raised into an angular position. I also disclose a rear flap or curtain which can close the space between the rear of the raised top and the top rear rail of the vehicle body or the top of a rear door in a station wagon. I make use of the side and rear flaps of my companion case in the present case and I will now describe them briefly.

In FIGURE 6, I show the plan view of the vehicle top D with the greater portion of the upper roof 1 removed. A pair of side flaps K are shown in this figure and each has an upper edge 30 that extends at an angle into the space provided between the upper and lower roofs 1 and 2 when the side flaps are not in use. Each side flap has an arcuate shaped rear bead-shaped edge 31. These bead edges 31 are designed to enter key-shaped slots 32 provided in the front surfaces 33 of the arcuate rear posts F. The forward end of the upper edge 30 of each flap extends to the front of the top D and may be pivotally connected at 34 with the end of the transverse front hollow reinforcing frame member 3. The lower edge 35 of each side flap K may be removably secured to the top rail of the side of the vehicle body A, as shown in FIGURE 7.

I provide means for yieldingly urging the top edges 30 of the side flaps K into the interior of the vehicle top D between the upper and lower roofs 1 and 2. A spring reel L is provided for each side flap and it is secured to the lower roof 2, see FIGURE 6. A cable or cord 36 is wound on the spring reel and extends therefrom and is passed around a pulley 37 and then is connected to the top edge 30 of the side flap. A second cable or cord 38 is wrapped around the spring reel L, and has its free end trained around a pulley 39 and connected to a coil spring 40 which in turn is connected to the edge 30 of the side flap K.

The construction is such that after the side flap has its lower edge 35 secured to the top side rail of the vehicle body, an upward movement of the top D about its cylindrical hinge E will cause the side flap K to be pulled from the space between the upper and lower roofs 1 and 2 and the arcuate edge 31 will feed into the key slot 32. This will move the top edge 30 of the flap toward the side of the vehicle top D and the top edge in its lateral movement will pull on the cable 36 and the spring 40 for unwinding this cable and the cable 38 from the spring reel L. In this way, a water-tight fit is provided by both side flaps K between the raised top D and the top side rails of the vehicle. As the top D is lowered into closed position, the cables 36 and 38 will be wound upon the reels L as the side flaps K are moved into the space between the upper and lower roofs 1 and 2. The coil springs 40 compensate for the swinging of the top edges 30 about their pivots 34 as the vehicle top D is raised or lowered.

FIGURE 7 shows the lateral edge of the upper roof 1 curved downwardly over the lateral edge of the lower roof 2, but spaced therefrom to form the passageway through which the side flap K can extend. The downwardly curved portion of the side of the upper roof 1 may terminate in a rain gutter 29. This provides a water-proof construction for the vehicle when the top is raised and the side flaps K, extended.

The vehicle top D is provided with a dome indicated generally at M. Within the dome I mount a rear flap N. Both FIGURES 1 and 6 show the upper edge 41 of the rear flap N connected by a cable or cord 42 to a spring reel P. This reel is housed within the dome M and yieldingly pulls on the cable 42 to move the rear flap N up into the area provided by the dome M.

In FIGURES 3 and 6, I show the pair of arcuate rear posts F provided with an arcuate key hole groove 43 that parallels the arcuate row of recesses 16 and is disposed to the rear of these recesses. The sides of the rear flap N are provided with a flexible bead that will feed down into the arcuate key-shaped grooves 43 as the vehicle top D is raised. FIGURE 4 shows the lower edge of the rear curtain provided with a tubular sleeve 44 in which a pair of extensible locking pins 45 are mounted. Adjacent to the tops of the pair of rear tubular corner columns B, I provide a recess 46 on the inner surfaces for receiving the extensible pins 45 when they are moved outwardly by the operator when he rotates a knob 47. The knob 47 is operatively connected to the extensible pins 45 in much the same manner as the handle 19 is operatively connected to the extensible locking rods 18 for holding the deck H in a desired angular position.

FIGURE 1 shows the rear flap N movable over a transverse guide rod 48 so that the portion of the flap extending from the guide rod 48 to the recesses 46 will extend substantially at right angles to that portion of the rear flap received within the dome M. The cover for the dome M has a rear portion extending downwardly a slight distance and then provided with a rain gutter 49, see FIGURE 1, that will drain any rain water off to the sides of the vehicle that is received in the gutter.

The arcuate key-shaped grooves 43 lie beyond the rear edge of the deck H and this permits the rear flap N to extend below the deck should the deck be in a raised position as indicated in FIGURE 4. If the operator wishes to leave the storage compartment above the deck H open so far as the rear of the vehicle is concerned, he can detach the extensible pins 45 from their recesses 46 and permit the flap N to remain housed within the dome M. The spring reel P will yieldingly pull on the cable 42 for urging the rear flap into the interior of the dome M and keep it there. The side flaps K can also remain in inoperative position within the hollow top if the operator wishes to expose the sides of the storage compartment provided between the deck and hinged vehicle top.

FIGURE 6 shows how the vehicle top D is reinforced. In addition to the front transverse hollow member 3 and the rear transverse hollow member 4, I provide a centrally disposed and longitudinally extending hollow member 50. This member is really in the shape of a Y and it has one end connected to the transverse member 4 as by welding and it has its Y-shaped arms 50′ secured to the transverse front member 3 by any means such as welding.

The side flaps K will conceal the intermediate arcuate posts G from exterior view when the vehicle top D is raised and the flaps are in operative position. The aerodynamic contour of the vehicle top D even when in raised position will permit the vehicle A to ride well and to hold the road. The doors of the vehicle including the rear door and tail gate can operate in the usual manner whether the top D is in raised or closed position. The rigidity of the vehicle is not weakened by the addition of my device. In fact the deck H can act as an additional bracing member as well as performing its other functions. The side flaps K and rear flap N are preferably reinforced by an intermediate layer of wire screening as disclosed in my companion case. This makes the flaps burglar proof. The front roof portion D has its front edge positioned adjacent to the top of the vehicle windshield 51.

I claim:

1. In a vehicle with a height-adjustable top for varying the cargo space:
   (a) a vehicle body having horizontal top rails extending lengthwise thereof along opposite lateral sides of the vehicle body;
   (b) the vehicle body being provided with a stationary front top section;
   (c) a vehicle top disposed above the top rails and extending rearwardly from said stationary front top section to the rear of said vehicle body;
   (d) means swingably securing the leading end of said top against said top section, whereby the top may be raised and lowered into different inclined positions relative to said top rails;
   (e) a cargo-supporting deck disposed under said top and having its leading end pivotally secured to said stationary front top section; said deck extending to the rear of said vehicle body;
   (f) said vehicle body being provided with tubular outer columns;
   (g) said top having arcuate posts slidably received in said outer columns; and
   (h) means for securing the deck to said arcuate posts for supporting the deck at a desired angular position.

2. The combination as set forth in claim 1: and in which
   (a) said top has lower and upper roofs providing a space therebetween;
   (b) a pair of triangularly-shaped flexible side flaps, each having a bottom edge attached to one of said top rails;
   (c) each side flap having an upper edge extending into the space between said two roofs; and
   (d) yielding means connected to the upper edges of said flaps and being operable to draw said side flaps automatically into the space between the roofs when said top is lowered and to allow said side flaps to extend when the top is raised;

(e) said side flaps extending past the sides of said deck so as to protect the deck and its cargo regardless of whether said deck is in a horizontal position or is in an angular position supported by said arcuate posts.

3. The combination as set forth in claim 2: and in which (a) a dome carried by said top and providing a space therebetween;

(b) a flexible rear flap having an upper end extending into the space between said dome and said top and having a lower end;

(c) means operable to removably anchor the lower end of said rear flap to said vehicle; and (d) yielding means connected to the upper end of said rear flap and being operable to automatically draw the rear flap into the space between said dome and said top when the top is lowered and permitting said rear flap to extend when said top is raised;

(e) said rear flap extending past the rear end of said deck so as to protect the deck and its cargo.

4. In a vehicle with a height-adjustable top for varying the cargo space:

(a) a vehicle body;

(b) a vehicle top hinged at its front edge to said body;

(c) arcuate rear corner posts secured to said top with the center of the arc for each rear corner post coinciding with the hinge for said top;

(d) said vehicle body having rear corner hollow columns for slidably receiving said arcuate rear corner posts;

(e) a deck underlying said vehicle top and having its front edge pivotally secured to said vehicle body;

(f) said arcuate posts having a plurality of recesses in the sides that face each other; and (g) means carried by said deck including fastening members adapted to enter the desired pair of recesses in said posts for supporting said deck in an angular position.

5. The combination as set forth in claim 4: and in which (a) a rear flap carried by said vehicle top and having flexible beaded side edges;

(b) said arcuate posts having key-hole-shaped arcuate grooves paralleling the rows of recesses in said posts and being positioned further away from said vehicle top hinge than are the said recesses;

(c) said key-hole-shaped arcuate grooves being adapted to receive the beaded side edges of said rear flap when said flap is extended;

(d) said rear flap having an upper and a lower edge;

(e) means carried by said lower edge for removably securing it to said vehicle body when said flap is extended;

(f) spring means carried by said vehicle top and connected to said upper edge for yieldingly urging said rear flap to be drawn up to said vehicle top; and (g) a housing on said vehicle top for enclosing said spring means and the portion of said rear flap not extending between said arcuate posts;

(h) the rear edge of said deck terminating short of said arcuate grooves so that the rear flap can be extended past said deck.

6. The combination as set forth in claim 4: and in which (a) the upper surface of said deck has a longitudinally extending groove for receiving the shank of a cargo retriever; and (b) a cargo retriever having a shank with a handle and a blade pivoted to the other end of said shank, said blade lying flat on the upper surface of said deck when said cargo retriever is in inoperative position.

7. In a vehicle with a height-adjustable top for varying the cargo space:

(a) a vehicle body;

(b) a vehicle top hinged at its front edge to said body and extending to the rear of said body;

(c) a deck underlying said vehicle top and having its front edge pivotally secured to said vehicle body; said deck extending to the rear of said body;

(d) means for supporting the rear of said vehicle top at different heights above the rear of said vehicle body;

(e) means for supporting the rear of said deck at the desired distance below the rear of said vehicle top when the latter is in a raised angular position;

(f) a cargo retriever having a shank adapted to extend longitudinally of and be supported by said deck with the end of the handle being disposed near the rear of said deck;

(g) said shank having a blade pivoted thereto, said blade normally lying flat on said deck and being disposed near the forward end of the deck; and (h) means interconnecting said blade and shank for causing said blade to swing into a plane normal to the axis of the shank when the handle is pulled rearwardly with respect to the deck.

References Cited in the file of this patent

UNITED STATES PATENTS

| 2,243,659 | Thompson | May 27, 1941 |
| 3,061,359 | Pearlman | Oct. 30, 1962 |